April 13, 1954   P. BLOEDEL ET AL   2,675,255
FLUID ACTUATED SEAL
Filed July 26, 1949   6 Sheets-Sheet 1

INVENTORS
PRENTICE BLOEDEL
SYDNEY HANSEL
DENIS GEORGE RICHES
DENNIS WILLIAM BROOKES

ATTORNEY

April 13, 1954 P. BLOEDEL ET AL 2,675,255
FLUID ACTUATED SEAL
Filed July 26, 1949 6 Sheets-Sheet 3

INVENTORS
PRENTICE BLOEDEL
SYDNEY HANSEL
DENIS GEORGE RICHES
DENNIS WILLIAM BROOKES

ATTORNEY

April 13, 1954    P. BLOEDEL ET AL    2,675,255
FLUID ACTUATED SEAL
Filed July 26, 1949    6 Sheets-Sheet 4

INVENTORS
PRENTICE BLOEDEL
SYDNEY HANSEL
DENIS GEORGE RICHES
DENNIS WILLIAM BROOKES

Ernest E. Carver
ATTORNEY

April 13, 1954   P. BLOEDEL ET AL   2,675,255
FLUID ACTUATED SEAL
Filed July 26, 1949   6 Sheets-Sheet 6

INVENTORS
PRENTICE BLOEDEL
SYDNEY HANSEL
DENIS GEORGE RICHES
DENNIS WILLIAM BROOKES
ATTORNEY

Patented Apr. 13, 1954

2,675,255

UNITED STATES PATENT OFFICE 2,675,255

FLUID ACTUATED SEAL

Prentice Bloedel, Sydney Hansel, and Denis G. Riches, Vancouver, British Columbia, and Dennis W. Brookes, Port Alberni, British Columbia, Canada, assignors to MacMillan & Bloedel (Alberni) Limited Application July 26, 1949, Serial No. 106,806

2 Claims. (Cl. 286—9)

Our invention relates to improvements in log barkers.

The objects of the invention are to provide a log barker of the ring type in which provision is made for sealing the running parts against undesirable leakage of water from the high pressure supply; to provide automatic means for maintaining water sealing pressure proportionate to the pressure of water within the machine during starting periods; to provide means for moving the barker to centre it about that part of the log which is passing through the barker and is being then acted upon by the high pressure barking jets, and to provide means where the main driving parts of the rotor of the barker are under constant water lubrication.

With the above and other objects in view which will appear as the specification proceeds, we will now describe the various parts of the invention.

Referring to the drawings:

Figure 14 is a diagrammatic view showing a typical circuit for controlling the endwise movement of the barker element.

In the drawings like characters of reference indicate corresponding parts in each figure.

The numeral 1 indicates a carriage mounted on wheels 2 to be operated on a short length of track 3. The carriage 1 supports a standard 5 having a horizontal shaft 6 journalled at its upper end. Mounted upon said shaft 6 is a bracket 7 secured to the periphery of a stator 8 of a barker element 9.

Pivotally mounted upon the carriage 1 is an oscillating cylinder 11 of a ram 12 which is fitted with a double acting plunger 14 pivotally connected to a bracket 15 of the stator 8. The plunger 14 is actuated by water pressure from a suitable source of supply to be hereinafter described, through a solenoid controlled selector valve 17 to raise or lower the stator about the shaft 6.

A horizontal ram 19 is fitted adjacent one end of the carriage 1, which consists of a cylinder 20 having a double-acting plunger 21, which is connected to a suitable abutment 23 adjacent the end of the track 3. The plunger 21 is actuated from a suitable source of fluid pressure to be hereinafter described, which flows to and from the cylinder 20 through water pipes 25 to impart movement to the carriage 1 in either direction, so that by selectively varying the height of the barker element 9 and varying the position of the carriage and the barker element, the stator 8 of said barker element may be adjusted to a position substantially concentric to the axis of whatever part of the log is passing through said barker element at the time.

Figure 3:
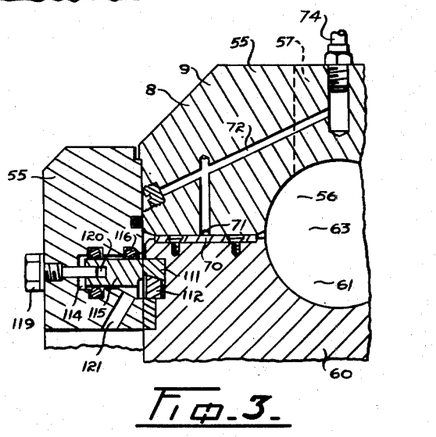
Figure 3 is a detail sectional view taken on the line 3—3 of Figure 2.
Figure 4:
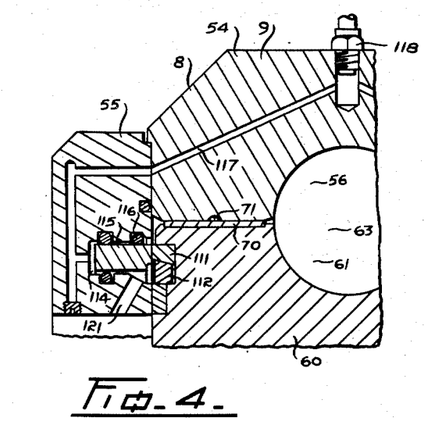
Figure 4 is a detail sectional view taken on the line 4—4 of Figure 2.
Figure 5:
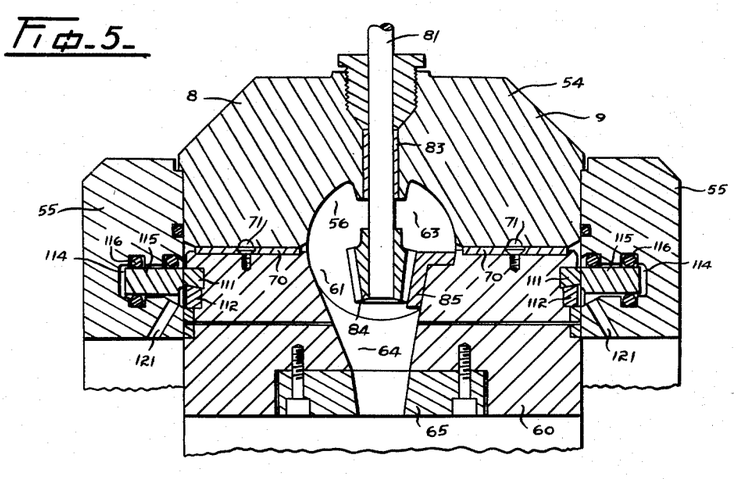
Figure 5 is a detail sectional view taken on the line 5—5 of Figure 2, showing the internal drive of the rotor.

The barker element 9 consists of the stator 8 which is made up with a centre ring 54, see particularly Figures 3, 4 and 5, having side flanges 55 securely bolted thereto. The centre ring is provided with an annular groove 56 having an inlet passage 57, shown in dotted line in Figure 3, and an inlet pipe connection 58 adapted for connection to a source of high pressure water supply.

Rotatable within the stator is a rotor 60 having a peripheral groove 61, which combined with the groove 56, forms an annular water passage 63, from which radial outlet passages 64 extend to the inner periphery of the rotor and terminate at nozzles 65, one only of each being shown in Figure 5. The water passage 63 is divided circumferentially into the grooves 56 and 61 for the purpose of reducing water friction therein to the detriment of the force of the jets of water discharging from the nozzles 65. The water entering the groove 56 will tend to flow in opposite directions around the water passage and if no groove 61 were provided as part of said water passage the greatest jet force would be through each nozzle 65 as it passed into register with the water inlet 57 and the least force would be diametrically opposite thereto. Besides this, water flowing from the water passage to any outlet passage 64, when said passage is disaligned with the inlet passage, would have to make a sharp right angle turn from the outer peripheral wall of the rotor into said passage, whereas with the groove 61 being formed in the rotor, a body of water substantially of the depth of said groove is being carried around with the rotor at substantially rotor speed, so that the water requirement of each of the nozzles is supplied from the body of water lying above the radial passage and the peripheral line of the rotor. In other words, the groove 61 provides a static pool of water from which water can be discharged through a passage vertical to its base, whereas without the groove, water flowing at varying speeds, according to the position of each jet away from the inlet passage, would be flowing along the periphery of the rotor and the entire volume of said water would be required to make a short radius turn into the outlet passage in close proximity to the peripheral line of the rotor.

The periphery of the rotor is fitted with synthetic resin or other water lubricating bearings 70 and the inner periphery of the stator 8 is provided with a groove 71 running circumferentially of said bearings. One or more ducts 72 communicate with said grooves 71 and with an oil inlet fitting 74 on the outer periphery of the stator. Oil under suitable pressure is fed through the fitting 74 to lubricate the bearings as the rotor is brought to rest, so that the rotor can be easily rotated on starting before the internal water pressure has exerted its contracting influence on the rotor. The rotor is driven by a motor 80, see Figures 1, 2 and 11, mounted upon the bracket 7. The shaft 81 of said motor is journalled in a glanded bearing 83 extending through the stator 8 into the water passage 63. A bevelled pinion 84 is secured upon the shaft, which pinion engages a bevelled ring gear 85 which is secured to one side of the groove 61 of the rotor 60.

Fitted in each face of the rotor 60 is an annular gasket 111 which is secured in position with a keeper 112, shown in Figures 3, 4 and 5, and opposing each gasket is an annular cylinder 114 provided in the inner faces of the flanges 55 of the stator 8. An annular piston 115 is fitted into each of the cylinders 114 and sealing rings 116 are provided to prevent leakage between the wall faces of said piston and said cylinder. Each cylinder 114 is provided at its base with one or more ducts 117, see Figure 4, which are fed with water from a desired source of supply through an inlet pipe 118 extending from the outer periphery of the stator 8. In order to prevent rotation of the pistons 115 within their cylinders 114, torque bolts 119 may be extended through the flange 55 into drill holes 120 in the base or inner end of the annular piston 114, as shown in Figure 3. In case of failure of sealing pressure in the cylinders, whereby the internal pressure within the water passage 63 produces an inordinate outflow past the gasket 111, weep holes 121 are provided between the inner peripheral wall of the cylinder 114 and the inner periphery of the flange 55.

The high internal pressure within the barker element when in operation, is normally in the order of fourteen to eighteen hundred pounds per square inch and tends to collapse the piston radially at its gasket engaging end, or cause it to assume the form of a truncated cone. Therefore, in order to provide a section which is of such resiliency as to enable it to seat properly against its gasket at all times, the radial dimension of a section of the said ring piston should be not less than one-sixth of the axial length of the section.

Figure 6:
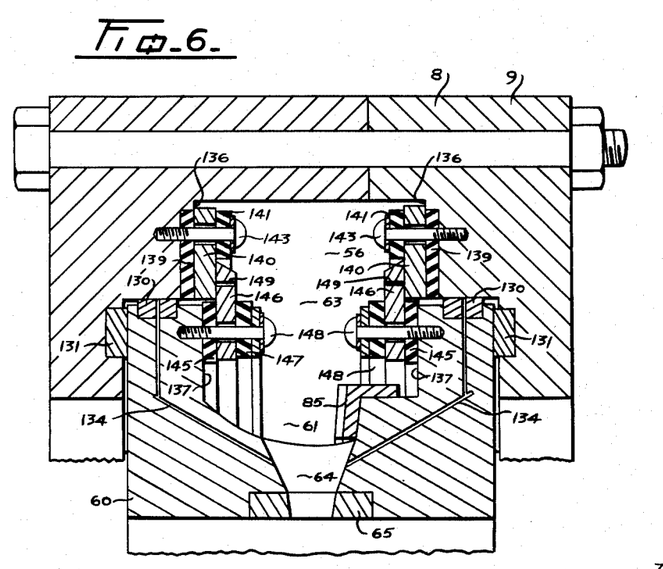
Figure 6 is a detail sectional view showing a modified gland structure between the rotor and stator.

Referring to the arrangement of bearings and gland as shown in Figure 6, the sealing pressure on the gland is entirely provided by the high pressure water passing through the nozzles 65. In this exemplification, bearings 130 are fitted upon the periphery of the rotor 60 and thrust bearings 131 are provided in the stator 8 to engage the faces of the rotor. Water lubrication may be provided for the bearings 130, if desired, through ducts 134 leading from the radial outlet passages 64 from the water passage 63.

The stator is provided with parallel inner face walls 136 and the rotor 60 is provided with parallel inner face walls 137. To each stator wall 136 a resilient base strip 139 is secured and to the inner face of this a porous metal or synthetic resin annular gasket 140 is retained by a resilient ring 141 which is held in place by a ring of bolts 143. The complementary rotor inner face walls 137 are each similarly provided with a resilient base strip 145 and a porous metal or synthetic resin annular gasket 146 retained in position in face to face contact with the gasket 140 by a ring 147 and a ring of bolts 148. The tension on the bolts 148 is adjusted to bring the gasket 140 and the gasket 146 into substantial sealing contact and the pressure as it is developed within the barker element will maintain the seal between the relatively rotating and contacting parts. While sufficient water leakage will take place between the parts 140 and 146 to provide proper lubrication during the interval when normal running pressures are being built up in the barker element, it may be desirable to provide a plurality of small openings 149 through the part 146 to allow some leakage between said parts to provide adequate lubrication under normal running conditions of the machine. One particular advantage of the gland sealing arrangement shown in Figure 6 is that grit in suspension in the water used for barking purposes is filtered out or kept away from the water lubricated bearings of the barker element provided the duct 134, described as being optional, is omitted.

Figure 7:
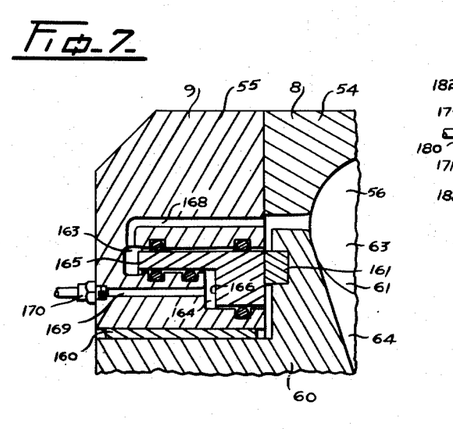
Figures 7 and 8 are detailed sectional views of other modifications of the gland structure.

In the arrangement shown in Figure 7, the rotor 60 is fitted with a bearing 160 and is journalled in the flange 55 of the stator 8. A gasket 161 is fitted to each face of the rotor and an annular cylinder 163 is formed in the flange opposing the gasket. The cylinder 163 is recessed on its inner periphery to form an auxiliary cylinder 164. An annular piston 165 having a step 166 on its inner periphery is mounted within the cylinder 163 and its recess or auxiliary cylinder 164. The bearing or front face of the piston engages the gasket 161. A duct 168 leads from the water passage 63 of the barker element 9 to the base of the cylinder 163 and an auxiliary water passage 169 having an inlet fitting 170 is adapted for communication with a source of water supply and the base of the auxiliary cylinder 164 to apply pressure from said source of supply to the step 166 of the piston 165. In this arrangement pressure is initially applied to the step 166 to urge the piston 165 into sealing contact with the gasket before or as soon as the rotor is set in motion and before the water pressure is built up in the water passage. This auxiliary pressure serves to prevent the pressure being built up in the annular passage 63 from pushing the piston 165 off the gasket and preventing an adequate thrust being developed at the back of said piston to move it back to its work.

Figure 8:
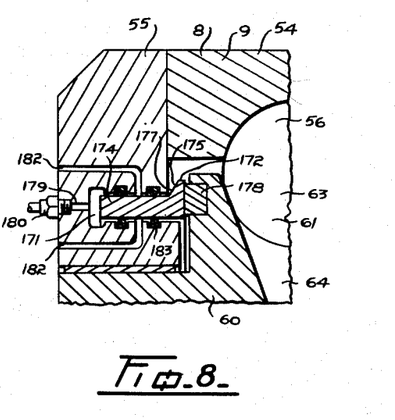

In the arrangement shown in Figure 8 similar functions are performed. In this case the cylinder is indicated by the numeral 171 and an annular space 172 is provided between the gasket face of the rotor 60 and the inner face of the flange 55. The cylinder is fitted with an annular piston 174 having a step 175 at its gasket end projecting from its outer periphery into the annular space 172 in such manner that the pressure developed in the water passage 63 is applied to the back surface 177 of the step 175 to urge the piston 174 into sealing engagement with the gasket 178. A duct 179 communicates with the back of the cylinder 171 and is provided with a fitting 180 for connection to a source of auxiliary water pressure for thrusting the piston into sealing engagement with the gasket 178 prior to the development of normal working pressure in the water passage 63. Two bleed ducts 182 communicate between the inner and outer peripheral walls of the cylinder 171 intermediate the enclosed length of the piston 174 and its sealing rings 183.

The preferred control of the pressure applied in sealing the glands between the water passage 63 and the exterior of the barker element 9 provides for a progressive increase of pressure on the gland or against the gasket, so that relative movement may take place between the stationary parts and the rotary parts of the gland when starting the machine in such manner as to avoid binding and to prevent scoring when the machine is being subjected to progressively increasing pressure, and also when the machine is running normally. It is found that in order to accomplish these objects, that gland pressure must be constantly provided which will lie between the curve of minimum seal pressure and that of maximum seal pressure. The graph shown in Figure 10 shows the maximum and minimum seal pressure curves and the pressure curve as regulated by the structure shown in Figure 9.

Figures 9, 10:
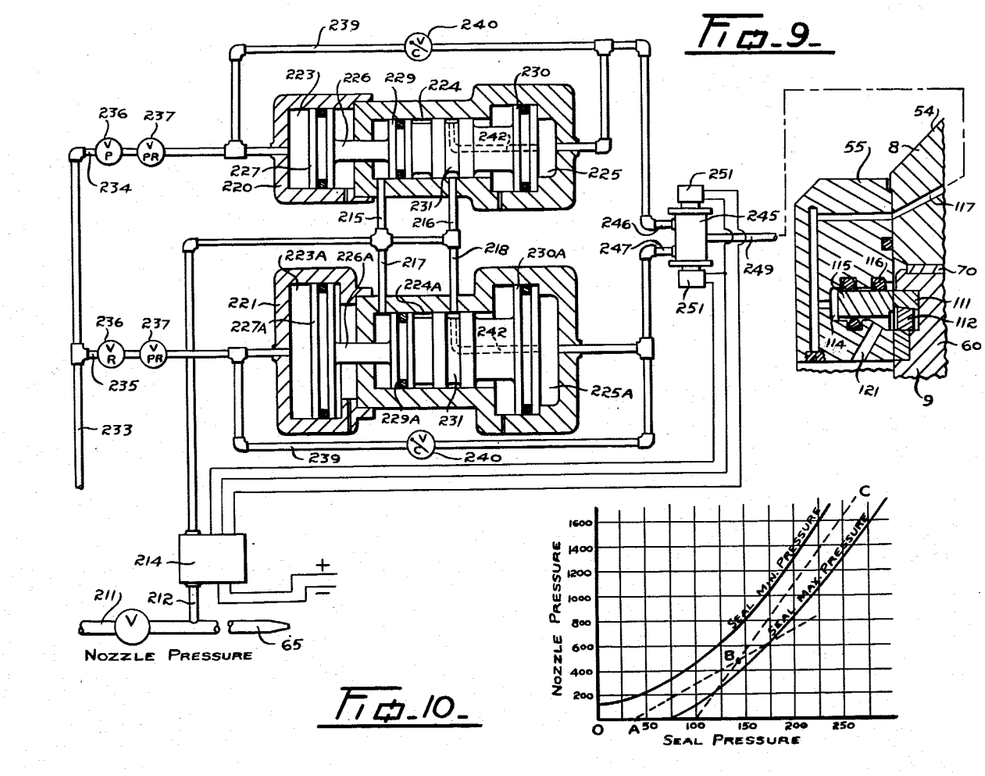
Figure 9 is a detail view of the gland pressure regulating means.
Figure 10 is a graph showing the minimum and maximum of the gland seal pressure curve and the curve of the pressure applied to the gland piston.

It will obviously be necessary to allow for replenishment of any seal pressure water applied through the inlet 118 to the piston 115, which may leak past the piston from the base of its cylinder 114 of Figures 3 and 4 and the Figure 9.

The barker element 9 receives its water from a source of supply through pumps, not shown, which delivers water to one or more nozzles 65, one of which is shown diagrammatically in Figure 9, which water communicates with the end of the piston 115 and the gasket 111 from the water passage 63. The supply pipe to the barker element and the nozzles is indicated as at 211. A branch pipe 212 leads from pipe 211 to a relay 214 and to inlets 215, 216, 217 and 218 of two compensators 220 and 221, which serve to reduce the water pressure supplied to the required sealing pressure. Each compensator 220 and 221 consists of aligned cylinders respectively indicated as 223, 223A, 224, 224A, 225 and 225A, in which plungers 226 and 226A float. The plungers 226 and 226A are provided with secondary pistons 227, 227A; primary pistons 229, 229A and seal pressure pistons 230 and 230A which work in the cylinders 223, 223A, 224, 224A, 225 and 225A respectively. The pistons 229 and 229A are grooved circumferentially to provide a water annulus 231, each of which is adapted to move into and out of register with high pressure inlets 216 or 218 and the left end of each cylinder 224 and 224A is connected to high pressure inlets 215 or 217.

A pipe 233 extends from a source of continuous supply such as any regular city service to branches 234 and 235, each of which is equipped with a pressure reducing valve 236 and a pressure relief valve 237. The pressure reducing valves are set to reduce the water service pressure to a predetermined constant pressure and the relief valves 237 are set to discharge at a predetermined higher pressure, so that pressures thrusting upon the secondary pistons 227 and 227A shall never exceed a given amount. The branch pipes 234 and 235 each communicate with one of the secondary cylinders 223 and 223A and a by-pass 239 fitted with check valve 240 connects each branch 234 or 235 with a cylinder 225 and a cylinder 225A. A duct 242, shown in dotted line in Figure 9, extends through each piston 230 and 230A and communicates with the annulus 231.

A solenoid operated selector valve 245 of any suitable type, is provided with two inlets 246 and 247 which are respectively connected with the by-pass pipes 239 of the compensators 220 and 221. The selector valve is also provided with one outlet 249 to which the inlet pipe 118 to the gland is connected. The solenoids 251 of the selector valve 245 are energized from a source of electrical energy supplied to the relay 214 and operated by any suitable water pressure tripping device within the relay. The relay may be of any desired type which will cause the selector valve 245 to operate to open inlet 246 and immediately thereafter close inlet 247 of the selector valve 245, or alternately open inlet 247 and close inlet 246 in response to predetermined pressures within the high pressure pipe 211. Since the relay 214 is incidental only to the control and may be of any desired type, further description is not deemed to be necessary.

The barker operates, when running normally, under nozzle pressure ranging between say 1200 and 1500 p. s. i. depending on the work to be done or the force necessary to remove the bark of different woods and as the pressure in each case varies from zero to the desired working pressure, the pressure required to properly seal the gland must be suitably proportioned. The graph shows the curve of the required gland sealing pressures within the machine operating from start or zero pressure to minimum nozzle operating pressure and also the curve with the machine operating from zero to maximum nozzle operating pressure, these curves being shown as seal minimum pressure and seal maximum pressure. In view of the above, a pressure curve ABC is determined between these two set curves which is automatically maintained in the pipe 249 between the selector valve 245 and the base of the cylinder 114 from the time the machine is started up to and during its normal running period.

The operation of the device is as follows: Water is first turned on manually from the service supply through the pipe 233, which flows through to the cylinders 223, 223A, 225 and 225A and through the selector valve 245 which initially is open between inlet 246 and pipe 249 to the base of the cylinder 114, whilst closed to inlet 247 to the selector valve. During the first few seconds when the gland sealing pressure is derived from the service supply, the sealing pressure builds up from O to A on the graph, which pressure is operatively applied through pipe 239, by-passing the compensator 220. When the pumps (not shown) are started to provide nozzle pressure and the barker is set in motion, pressure builds up in pipes 211, 212, 215, 216, 217 and 218 in the area ratio of the pistons 229 and 230, which areas are such as to maintain the seal pressure and the nozzle pressure in the ratio as defined by the slope AB of the graph. Any leakage past the piston 115 will result in a drop in pressure in the cylinder 225 which will throw the compensator 220 out of balance and allow the piston 230 to move to the right incidental to pressure at the back or the left of piston 229, which will of course replenish the leak in cylinder 114 as some water will flow through the duct 242 and its annulus 231, which will then be in register with 216.

When the nozzle pressure has reached the point horizontal to the point B on the graph, the relay 214 will switch the current from one solenoid 251 to the other of the selector valve 245, closing off the inlet 246 immediately following the opening of the inlet 247.

It will be understood that the pistons 227 and 227A serve to apply a pressure of predetermined value to the inlet side of the selector valve 245 prior to the starting of the machine, which pressure will be augmented progressively during the increase of nozzle pressure built up in the machine while running. If these initial starting pressures were not provided for, the gland seal curve developed might well be outside the range of minimum and maximum seal pressures as shown by the graph.

The ratio between the areas of pistons 230 and 229 of compensator 220 is taken as being 3–1, and the ratio of areas of pistons 230A and 229A is taken, for the purpose of description only, as 5 to 1, and the pressure being constantly applied to the pistons 227 and 227A can be taken as 40 p. s. i., though the piston 227A may be set to a higher pressure if desired.

As soon as the compensator 220 is isolated by the selector valve 245, the compensator 221 commences to function in the manner above described, maintaining the seal pressure and nozzle pressure in the ratio as defined in the slope BC of the graph.

When the barker is stopped and the water supply thereto discontinued, the water service through the pipe 233 should be stopped also, thereby removing all pressure from the base of the cylinder 114.

Figure 1:
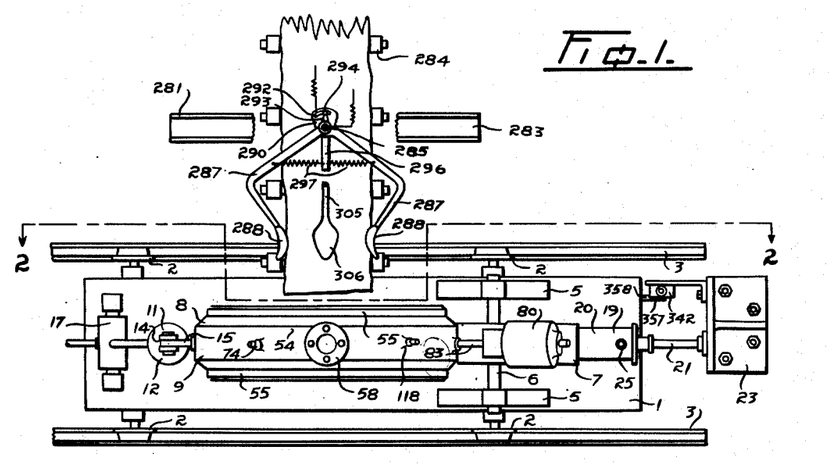
Figure 1 is a plan view of the invention.
Figure 1A:
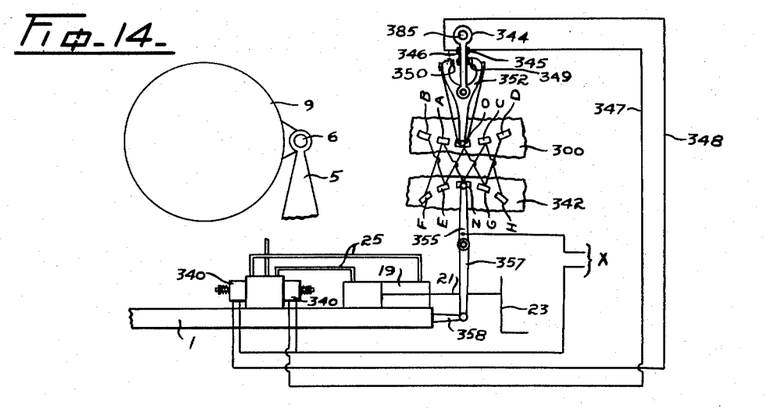
Figure 2:
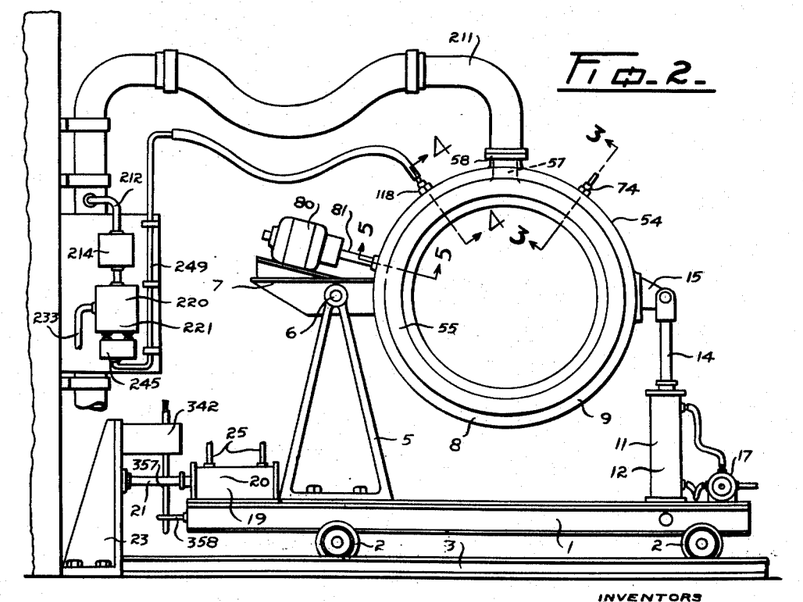
Figure 2 is a transverse sectional view taken on the line 2—2 of Figure 1.
Figure 11:
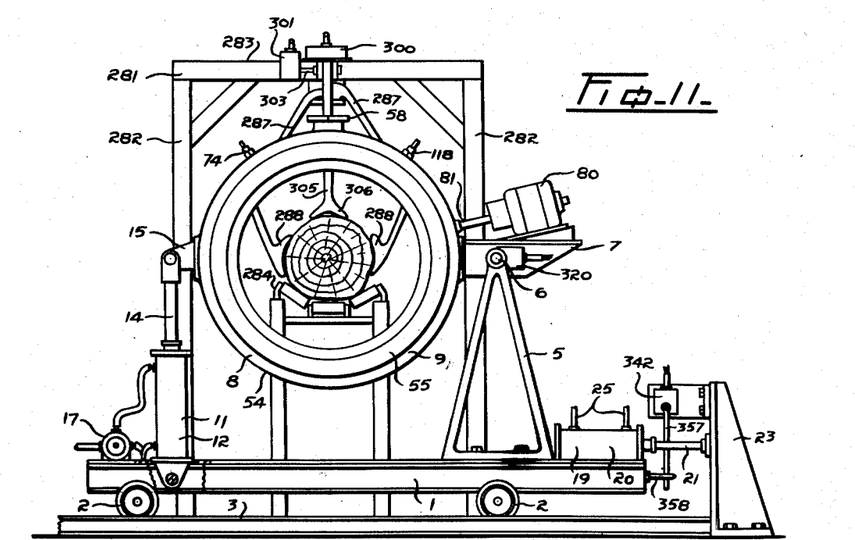
Figure 11 is a transverse elevational view showing the means for centrallizing the barker about a log.
Figure 12:
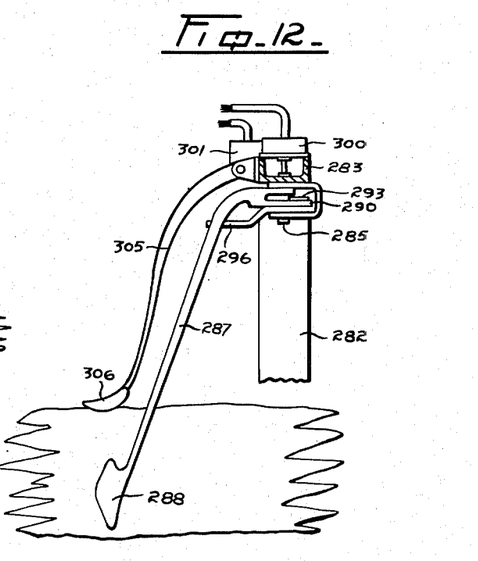
Figure 12 is a detail side elevational view of log engaging arms.
Figure 13:
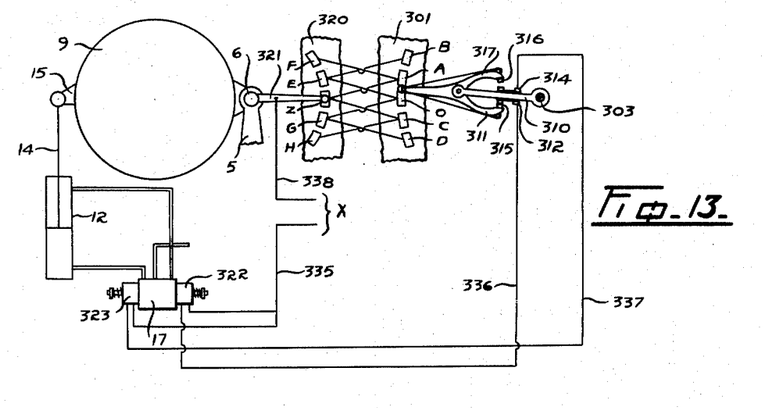
Figure 13 is a diagrammatic view showing a typical circuit for controlling the vertical movement of the barker element.
Figure 15:
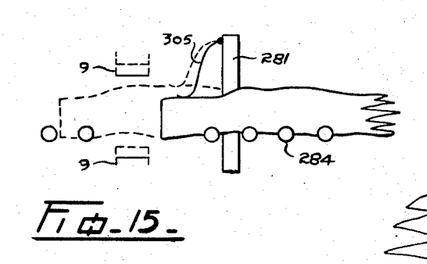
Figure 15 is a diagrammatic view showing the movement of the barker incidental to passage of a log having irregularities on its upper surface.

Mounted at the entrance end of the barker element 9 is a frame 281, see Figures 1, 2 and 11, having side members 282 and a horizontal member 283 and extending lengthwise below said horizontal member is a log conveyor 284 of any desired type for the purpose of feeding logs to be debarked through the barker element. Swingingly mounted about a vertical shaft 285 is a pair of arms 287 each having a shoe 288 at its outer end. The arms are so curved as to project downwardly to the sides of any log upon the conveyor and to engage said log adjacent the barker element with its shoes 288, as shown in Figures 1, 11 and 12. Formed integrally with one of the arms 287 and projecting preferably to the rear of the shaft 285 is a segment 290 carrying an insulated segmental switch contact 292. The second of the pair of arms 287 is provided with a radially extending arm 293 having a wiping contact 294 which normally rides in contact with the switch contact 292. Extending forwardly from the shaft 285 and secured thereto is a lever 296 and both of the log side contacting arms 287 are resiliently connected to said lever 296 by two springs 297, both of which are of equal tension, so that the shoes 288 when engaging the sides of a log swing the lever into alignment with the longitudinal axis of that part of the log which is engaged by said shoes. The shaft 285 is axially connected with a control switch 300 which is mounted on the horizontal member 283 of the frame 281. A control switch 301, which is similar to the switch 300, is mounted on the front side of the horizontal member and is operated through a horizontal shaft 303, see Figures 11 and 12. The shaft 303 is fitted with an arm 305 having a shoe 306 which is adapted to ride on the top of a log travelling through the barker element and rock the shaft accordingly as the shoe rides up over a knot or down into a depression in the upper surface of the log. The circuit shown in Figure 13 is that controlled by the up and down movement of the shoe 306 and the arm 305 above a log. The control switch 301 as shown in the diagram, includes an arm 310 secured to the shaft 303 which is forked at its outer end to rockingly support a forked contact finger 311. The arm 310 has two insulated contacts 312 and 314, which are adapted to be engaged by contacts 315 and 316 respectively of the forked end 317 of the finger 311. The outer end of the finger 311 is adapted to engage arcuately disposed contacts OABCD of switch 301 as the arm is moved in response to the vertical movement of the arm 305. A switch 320 which is complementary to the switch 301 is operatively coupled to the shaft 6 of the barker element 9. This switch has a contact finger 321 which is secured to the shaft 6 to rock therewith. The outer end of the contact finger 321 sweeps a plurality of spaced contacts, variously indicated as ZEFGH in the diagram. The circuit includes solenoids 322 and 323 which actuate the selector valve 17 for raising or lowering the barker element 9 by means of the ram 12, and which are respectively connected in the following manner. From a source of electrical supply a wire 335 leads to both solenoids 322 and 323, a wire 336 leads from 322 to the contact 312 of the switch arm 310 and a wire 337 connects the second solenoid 323 with the contact 314 of said switch arm 310. The contacts of the control switch 301 and that of the complementary switch 320 are connected as follows: O to E and G; A to Z and F; B to E; C to Z and H, D to G, and the finger 321 of the switch 320 is connected through a wire 338 back to the source of supply X. If when feeding a log along the conveyor as shown in Figure 15, a high spot is encountered such as is shown in dotted line, the arm 305 will be raised, which will correspondingly swing the arm 310 of the switch 301, causing the forked finger 311 to move to the position shown in the diagram with the contact 315 closed to the wire 336, and the finger will be carried up from contact O to A, thus connecting A of 301 with Z of switch 320 and through finger 321 and wire 338 to current supply X. From the current supply the circuit continues through 335 to both solenoids and thence through the solenoid to the right of the diagram through 336 to contact 312 of the switch 301. This movement closes the circuit and actuates the said right hand solenoid to cause the water to flow to the ram 12 and raise the barker element. The raising of the barker element will lower the finger 321 of switch 320 to move downwardly onto contact G and if the finger 311 stops on contact A and the finger 321 moves off contact Z, then the circuit will be broken and the valve 17 will automatically close. If on the other hand, the finger 311 continues upwardly onto B, the barker element will continue to lift the centre about the log until the finger 321 moves from G onto H and again breaks the circuit, thus forming a limit stop. From the position last described, the movement must necessarily be reversed and as the shoe 306 drops, causing the finger 311 to lower, the first step would close the contacts 314, 316 directing the current flow towards the left hand solenoid 323, then as the contact finger 311 moves onto A the circuit would close, causing the valve 17 to direct water to the ram to lower it and cause the contact finger 321 to move from H towards G.

Figure 16:
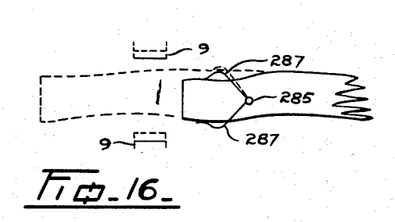
Figure 16 is a diagrammatic view showing the movement of the barker incidental to the passage of a log having irregularities on its sides or having side curvature.

The diagram as shown in Figure 14 shows the circuit controlling the endwise movement of the carriage and the barker element 9 and includes the control switch 300, the circuit breaker contacts 292 and 294, two solenoids 340 and a complementary switch 342 and the necessary connections. The switch 300 is identical to the switch 301 having a switch arm 344 and contacts 345 and 346 connected to reversing leads 347 and 348 respectively, and which are adapted to selectively engage contacts 349 and 350 on the forked contact finger 352. The finger 352 is adapted to selectively engage spaced contacts OABCD, which are cross connected to contacts ZEFG and H of the complementary switch 342 which has contact finger 355 and is rocked by a pendulum lever 357. The lever 357 passes through an eyed bolt 358 secured to one end of the carriage 1, so that endwise carriage movement will actuate the switch 342 to move its contact finger across the face of the contacts ZEFGH. As the arms 287 in their movement sidewise, as indicated in dotted line in Figure 16, cause the lever 296 to swing in the same direction from a position parallel to the log conveyor, so the lever 296 will actuate the switch 300, which will cause current to flow to the appropriate contact of the switch 342 and energize its solenoid 340 to actuate the valve, so that the ram 19 will move the carriage and the barker element 9 to centre the log horizontally. Obviously a little time lag will occur between the movements of the arms 287 and 305 and the movement of the barker element 9, so these arms are mounted an appropriate distance from said barker element to allow for the jets to be, as far as possible, equidistantly spaced from the axis of that part of the log which is at the moment within their operating range. The contacts 292 and 294 associated with the side arms 287 are connected with the circuit to the conveyor 284, so that if horizontally disposed knots or other protuberances on a log on the conveyor cause said arms to spread to the extent of separating the contacts 292 and 294, the conveyor will immediately be stopped and the obstruction prevented from passing into the barker element.

What we claim as our invention is:

1. The combination with a machine provided with a stator and a rotor having complementary end faces, a gland comprising an annular gasket carried upon one of said end faces, an annular cylinder formed in the second end face, said cylinder having an annular piston adapted to bear upon the annular gasket, said piston having annular inner and outer thrust areas remote from its gasket end, means for applying fluid pressure to the outer thrust area extending from the interior of the machine to an inner end face of the stator only, and means for applying fluid pressure to the inner thrust area extending from outside the machine through the stator and through to the base of the cylinder.

2. The combination with a machine provided with a stator and a rotor having complementary end faces, a gland comprising an annular gasket carried upon one of said end faces, an annular cylinder formed in the second end face, said cylinder having an annular piston adapted to bear upon the annular gasket, said piston having annular inner and outer thrust areas remote from its gasket end, and means for applying fluid pressure to each of said inner and outer thrust areas wherein the annular cylinder is provided with a pair of spaced annular packings upon its inner and its outer periphery and a duct extends from the interspace between each pair of packings to discharge exteriorly of the stator.

References Cited in the file of this patent

UNITED STATES PATENTS

| Number | Name | Date |
|---|---|---|
| 747,772 | Rickman | Dec. 22, 1903 |
| 1,080,751 | Dahlke | Dec. 9, 1913 |
| 1,467,575 | Flanders | Sept. 11, 1923 |
| 1,540,886 | Huff | June 9, 1925 |
| 1,835,877 | Joyce | Dec. 8, 1931 |
| 1,859,039 | Joyce | May 17, 1932 |
| 2,096,899 | Hornschuch | Oct. 26, 1937 |
| 2,109,679 | Neveling | Mar. 1, 1938 |
| 2,182,892 | Fors | Dec. 12, 1939 |
| 2,299,395 | Karlberg | Oct. 20, 1942 |
| 2,364,133 | Dela Roza | Dec. 5, 1944 |
| 2,370,964 | Janette | Mar. 6, 1945 |
| 2,422,757 | Swift | June 24, 1947 |
| 2,463,084 | Bukowsky | Mar. 1, 1949 |
| 2,470,419 | Voytech | May 17, 1949 |
| 2,473,461 | White | June 14, 1949 |
| 2,477,922 | Emery | Aug. 2, 1949 |

FOREIGN PATENTS

| Number | Country | Date |
|---|---|---|
| 409,600 | Great Britain | of 1934 |